United States Patent [19]

Bolick, Jr.

[11] 3,820,101

[45] June 25, 1974

[54] REMAINING TAPE SENSING APPARATUS

[75] Inventor: Fred C. Bolick, Jr., Atlanta, Ga.

[73] Assignee: Lanier Electronic Laboratory, Inc., Atlanta, Ga.

[22] Filed: June 15, 1972

[21] Appl. No.: 263,314

[52] U.S. Cl. .......... 340/259, 179/100.2 Z, 226/100, 242/57, 274/4 C

[51] Int. Cl. .......... G08b 21/00

[58] Field of Search ...... 340/259, 260; 179/100.2 Z; 226/100; 242/57; 274/4 C

[56] References Cited

UNITED STATES PATENTS

| | | | |
|---|---|---|---|
| 1,300,257 | 4/1919 | Felland | 340/260 |
| 1,982,133 | 11/1934 | Canady | 340/260 |
| 3,146,432 | 8/1964 | Johnson | 340/259 X |
| 3,148,814 | 9/1964 | Studer | 226/100 X |
| 3,288,385 | 11/1966 | Markakis et al. | 242/57 |
| 3,353,764 | 11/1967 | Walker | 242/57 |
| 3,370,286 | 2/1968 | Buss | 340/259 |
| 3,633,804 | 1/1972 | Kitazawa | 340/259 X |
| 3,638,955 | 2/1972 | Wada | 274/4 C |
| 3,660,810 | 5/1972 | Yoshii | 340/259 |
| 3,675,228 | 7/1972 | Iwamoto | 340/259 |

*Primary Examiner*—David L. Trafton
*Attorney, Agent, or Firm*—Jones, Thomas & Askew

[57] ABSTRACT

Apparatus for use with a web feed apparatus such as a tape recorder, in which a supply of the web material wound on a spool is withdrawn from the spool for use, to provide an indication when only a predetermined amount of web remains on the spool. The present apparatus is responsive to the amount of tape remaining on the spool, and so an indication corresponding to the amount of remaining tape is made irrespective of the amount of tape initially on the spool. In one disclosed embodiment of the invention, a source of suitable radiation, such as illumination, and a radiation sensitive device are positioned on opposite sides of the tape spool at a predetermined distance from the axis of the spool, so that the radiation path remains interrupted by the tape on the spool until only a predetermined amount of tape remains on the spool. No mechanical or electrical interconnection with the tape transport mechanism is required. In another disclosed embodiment, the tape supply spool is connected to provide a signal having a parameter which is proportional to the speed at which the tape supply spool is rotated. A signal is provided in response to a parameter value corresponding to the supply spool rotational speed caused by a predetermined amount of remaining tape.

3 Claims, 4 Drawing Figures

REMAINING TAPE SENSING APPARATUS

This invention relates in general to web apparatus and in particular to a tape sensing apparatus for use with a magnetic tape recording or reproducing apparatus.

Although the term "tape recorder" is used hereinafter with reference to an environment of application for the herein-disclosed embodiment of the present invention, it is to be understood that this term is used in an illustrative sense to denote apparatus utilizing magnetic tape as a record and/or playback medium and that the present invention is not intended to be limited to use with record-only, playback-only or record-playback functions.

Since the typical operation of a tape recorder involves withdrawing a quantity of tape from a supply spool or reel, traversing the tape past one or more transducer heads, and then winding this tape on a takeup spool or reel, it is common in the art of tape recording apparatus to provide some type of indicator which provides, in one manner or another, an indication of the amount of tape which has been involved with a particular recording and/or playback operation. These typical counters of the prior art are mechanically or electrically driven by rotation or other movement of the tape transport mechanism, with typical examples including a mechanical digital-type counter driven by an appropriate mechanical interconnection either with the drive shaft rotated by one of the tape spools or by interconnection with the tape capstan or pinch roller.

The provision of a suitable tape indication apparatus is especially important for tape recorders designed and intended for use as dictation or dictation-transcription apparatus, since a person dictating correspondence or other messages for recording by such special-purpose tape recorders should be aware of how much of the available supply of tape has been used by his dictation. This awareness is desirable not only to inform the message transcriber of the quantity and length of recorded messages, but also to inform the dictator of the amount of "clean," that is, undictated, tape which remains on a particular tape spool or reel. Apparatus indicating the extent to which the tape or other recording medium of dictation apparatus has been exhausted employs operational principles and apparatus which are generally similar to indicators of general-purpose tape recorders, with the dictation indication apparatus typically including a linear or circular scale which is traversed by a pointer mechanically or electrically coupled to be driven by the tape transport mechanism of the dictation apparatus. Such indicators of the prior art are considered to provide an approximate indication of the amount of remaining unused tape, although these prior art indicators actually count cumulative movement of the tape transport mechanism rather than the actual tape remaining for recording or playback.

While many of the prior art tape indicators provide an acceptable showing of the relative lengths of messages recorded on a quantity of tape, such prior art indicators tend to be less than satisfactory to indicate, with a desired degree of reliability and repeatability, the exact amount of unused recording tape which remains on the tape supply spool or reel. The person using dictation apparatus typically wants to know when a predetermined amount of recording time, e.g. 3 minutes, remains on the tape supply. The prior art indicators actually count the number of revolutions of some mechanical component, such as the drive spindle engaged by the tape supply spool, and it will be appreciated that this indication correlates exactly with the amount of tape remaining on the spool only if an identical amount of tape is provided on each and every tape supply spool used with the dictation apparatus, a condition of perfection which is not readily attainable in commercial practice. Moreover, a dictator may deliberately desire to use different tape supplies which have variable lengths of tape for selectively providing different maximum recording times. Furthermore, prior art indicators of the type which function through an interconnection with the tape transport mechanism generally provide a cumulative indication of tape movement from the tape supply spool, and so such indicators must be accurately and repeatably resettable to a zero position if a subsequent indicating operation is to have any meaning. The necessity for providing resetting apparatus only adds to the complexity and expense of such indicating apparatus.

It is known that prior art expedients have been proposed for providing end-of-tape indications. For example, it is known to provide a conductive strip of foil or other suitable material over the oxide coating of the tape, so that an electrical connection is completed through the foil and a pair of electrodes positioned on the tape path to be contacted by the passing foil. An alternative expedient requires the use of a transparent trailer strip attached to the end of the recording tape, along with suitable apparatus for detecting the end of the recording tape and the presence of the trailer strip. While both of these expedients may be useful to indicate when the tape supply has become exhausted, it will be apparent that these expedients are impractical for use to indicate when a predetermined amount of tape remains on the supply spool. Placing a special indication segment on the tape at some predetermined length removed from the tape end would necessarily interrupt the oxide coating of the tape and would create a gap or interruption in the dictation recorded onto the tape; such gaps or interruptions are unacceptable to users of dictation equipment. Moreover, dictation recording equipment is becoming increasingly standardized to accept conventionally available general-purpose tape cassettes, such as the well-known "C-60" cassette, and so any remaining-tape indication apparatus which requires specially-prepared tapes will necessarily be incompatible with conventional cassettes and will be less desirable to the ultimate user.

Accordingly, it is an object of the present invention to provide improved tape indication apparatus.

It is another object of the present invention to provide improved apparatus for sensing a predetermined amount of tape remaining on a tape supply spool.

It is still another object of the present invention to provide improved remaining tape sensing apparatus for use with dictation recording apparatus.

Other objects as well as many of the attendant advantages of the present invention will become more readily apparent from the following description of the disclosed embodiment of the invention, including the annexed drawing, in which.

Stated in general terms, the present invention comprises apparatus which is operative in conjunction with a tape supply member, such as a tape supply spool, to provide a control signal when the tape has been withdrawn from the tape supply so that only a predetermined amount of tape remains thereon. Since a predetermined amount of tape remaining on the tape supply implies a predetermined amount of remaining record (or playback) time, the control signal can be used to provide a suitable indication of the fact that only the predetermined amount of tape remains to be withdrawn from the spool. This indication is repeatably provided irrespective of the amount of tape initially present on the tape supply spool.

Figure 2:
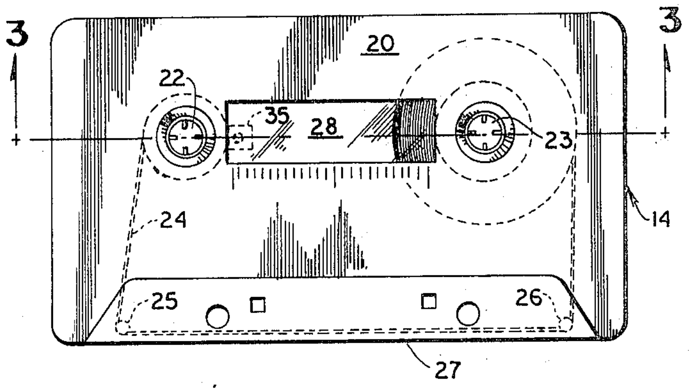
FIG. 2 shows a plan view of a tape cassette disposed in apparatus including the first disclosed embodiment of the invention.
Figure 1:
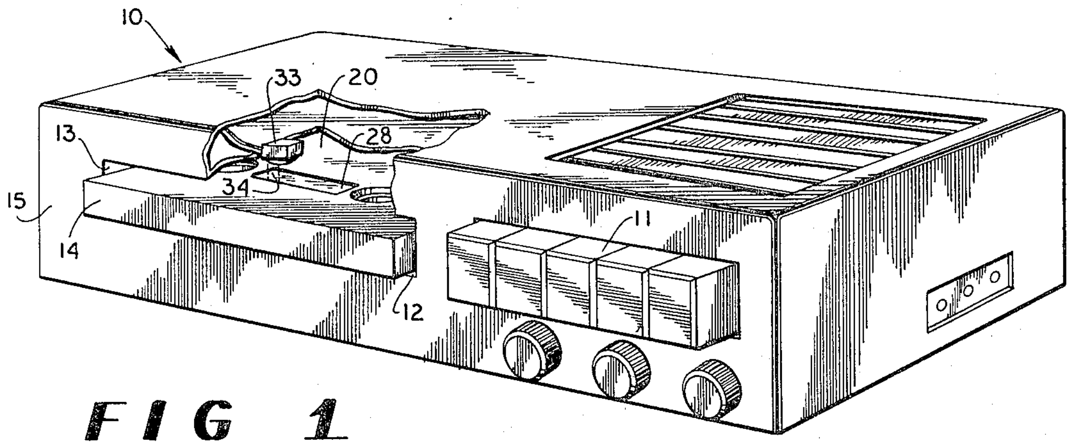
FIG. 1 shows a pictorial view of dictation recording apparatus incorporating a first disclosed embodiment of the present invention.
Figure 3:
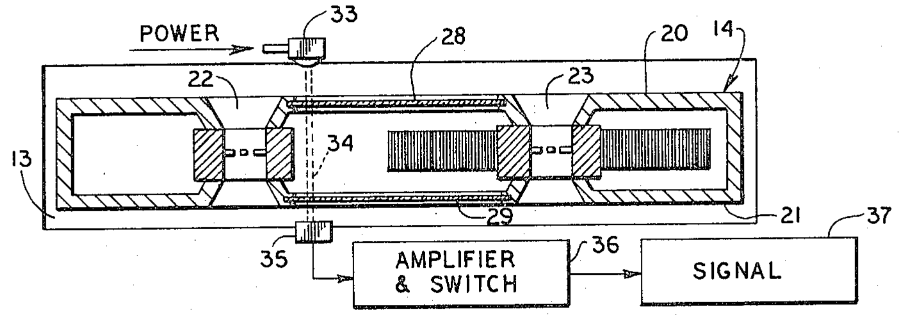
FIG. 3 shows a section view taken along line 3—3 of FIG. 2 and further illustrating the first disclosed embodiment of the present invention.

Stated more particularly and with reference taken to the first disclosed embodiment of the present invention as described herein and shown in FIGS. 1–3, there is shown generally at 10 a tape recorder apparatus useable for recording and/or transcribing dictation, for example, and including the various controls 11 which are connected with the tape transport and other operating mechanisms of the recorder to select various modes of recorder operation. The specific details of recorder features such as the tape transport mechanism, for example, form no part of the present invention and need not be further described herein.

The recorder of the present embodiment is configured to receive a conventional recording tape cassette generally known as the C-60 cassette, and so the recorder includes a suitable aperture 12 opening into a receptacle 13 configured to receive such a tape cassette 14. Although the cassette receptacle 13 is shown in the apparatus 10 affording insertion and removal of the cassette from the front panel 15 of the recorder apparatus, it will be understood that this showing is by way of example only and that the cassette receptacle can alternatively be located elsewhere with respect to the apparatus.

The cassette 14, as best seen in FIGS. 2 and 3, includes a pair of spaced apart cover surfaces 20 and 21 with a tape supply spool 22 and a tape winding spool 23 rotatably mounted between the cover surfaces. A length of recording tape 24 extends from the supply spool 22 to pass over a pair of guide members 25 and 26 and then to be wound around the winding spool 23. One or more openings are provided in the front wall 27 of the cassette 14 to permit transducing contact between the recording tape and one or more transducer devices disposed within the cassette receptacle 13 of the recorder, all as known to those skilled in the art. A pair of aligned windows 28 and 29, made of a suitable transparent material such as plastic or the like, are provided in the corresponding cover surfaces 20 and 21, and the amount of tape 24 wound on either of the spools 22 and 23 can be visually observed through these windows. It will be understood that the recorder apparatus 10 is provided with drive spindles operative to engage the spools 22 and 23 of a cassette inserted within the receptacle 13.

Referring now to FIGS. 1 and 3, it will be seen that a suitable source 33 of radiated energy is positioned at one side of the receptacle 13 to direct a beam 34 of radiated energy in a direction aimed toward a radiated energy responsive device 35 disposed on the opposite side of the receptacle. A satisfactory radiated energy source 33 can be provided with an incandescent lamp, although a device such as a light-emitting diode may be preferable in view of its relatively long life. The radiated energy responsive device 35 can be provided by a suitable phototransistor. The radiated energy source 33 is connected to an appropriate source of electrical power within the apparatus 10, and the electrical output of the radiated energy responsive device 35 is supplied to a suitable amplifier and switch apparatus 36. The amplifier and switch apparatus 36 is of conventional design and functions to amplify the signal provided by the radiated energy responsive device 35, in response to the intensity of radiated energy received by this device, and to energize a suitable signal device 37 in response to the amplified signal from the radiated energy responsive device. The signal device 37 is preferably any device which, when activated, provides an audible and/or visible signal to the operator of the dictation apparatus 10; the signal device can be provided by apparatus such as a buzzer or a tone generator, operating either through or independent of the playback speaker of the dictation apparatus, and it will be understood from those skilled in the art that the operation of this signal device can be interlocked with other controls on the dictation apparatus, such as a dictate-forward switch, so that the signal device produces a signal in response to output from the amplifier and switch apparatus 36 only at times when the dictation apparatus is operated in a dictate mode.

It will be understood that the source 33 of radiated energy may be any source which produces a beam 34 of radiated energy capable of being interrupted by the intervening presence of the tape on the supply spool 22. Thus, the beam 34 can be provided by radiated electromagnetic "illumination" energy in either the visible or the invisible portion of the spectrum, or can alternatively be provided by energy other than electromagnetic energy.

It is particularly evident from FIG. 3 that the radiated energy source 33 and the radiated energy responsive device 35 are positioned within the receptacle 13 to direct the beam 34 through the aligned windows 28 and 29 at a predetermined distance spaced from the tape supply spool 22 and corresponding to a predetermined diameter of the supply spool 22 along with a predetermined minimum remaining amount of tape. Since the amount of tape 24 remaining on the supply spool 22 at any time correlates exactly with the amount of remaining dictation time, assuming a particular record-playback tape speed, it follows that the beam 34, which is prevented by the tape wound on a full supply spool 22 from impinging the radiated energy responsive device 35, will be permitted to impinge the radiated energy responsive device only after enough tape has been unwound from the supply spool 22 so that the tape remaining on the supply spool is less than the amount necessary to block the beam 34. It can also be seen that this predetermined amount of tape remaining on the supply spool 22, assuming a predetermined location of the beam 34 and a certain thickness of the tape 24, is always substantially the same irrespective of the amount of tape initially present on the supply spool. Accordingly, it will be seen that the signal device 37 is caused to become operative when the amount of tape remaining on the supply spool 22 has been reduced to a predetermined amount, corresponding to a predetermined amount of remaining dictation time. The spacing between the beam 34 and the axis of rotation of the supply spool 22 determines the amount of this predetermined remaining tape and time.

Although the disclosed embodiment of the present invention shows the radiated energy source and the radiated energy responsive device positioned to place the beam 34 substantially perpendicular to the rotational plane of the supply pool 22, it will be understood that the foregoing arrangement is utilized in the disclosed embodiment to take advantage of the windows 28 and 29 which are found in the currently-popular C-60 tape cassettes. Other arrangements of a radiated energy source and a radiated energy responsive device may be used in the practice of the present invention, however, provided that the beam remains interrupted until only a predetermined quantity of tape remains on the supply spool or reel. In the case of a tape recorder utilizing a conventional reel-to-reel tape system, it may prove feasible to project the beam of radiated energy substantially coplanar with the tape reel so that the beam passes between the flanges of the reel and is interrupted by the tape wound around the hub portion of the reel.

If desired, the transition from interrupted-beam to uninterrupted-beam can be accentuated by suitable techniques such as focusing the beam or by providing a suitable aperture to allow only a desired portion of the radiation from the source 33 to operate the device 35.

Figure 4:
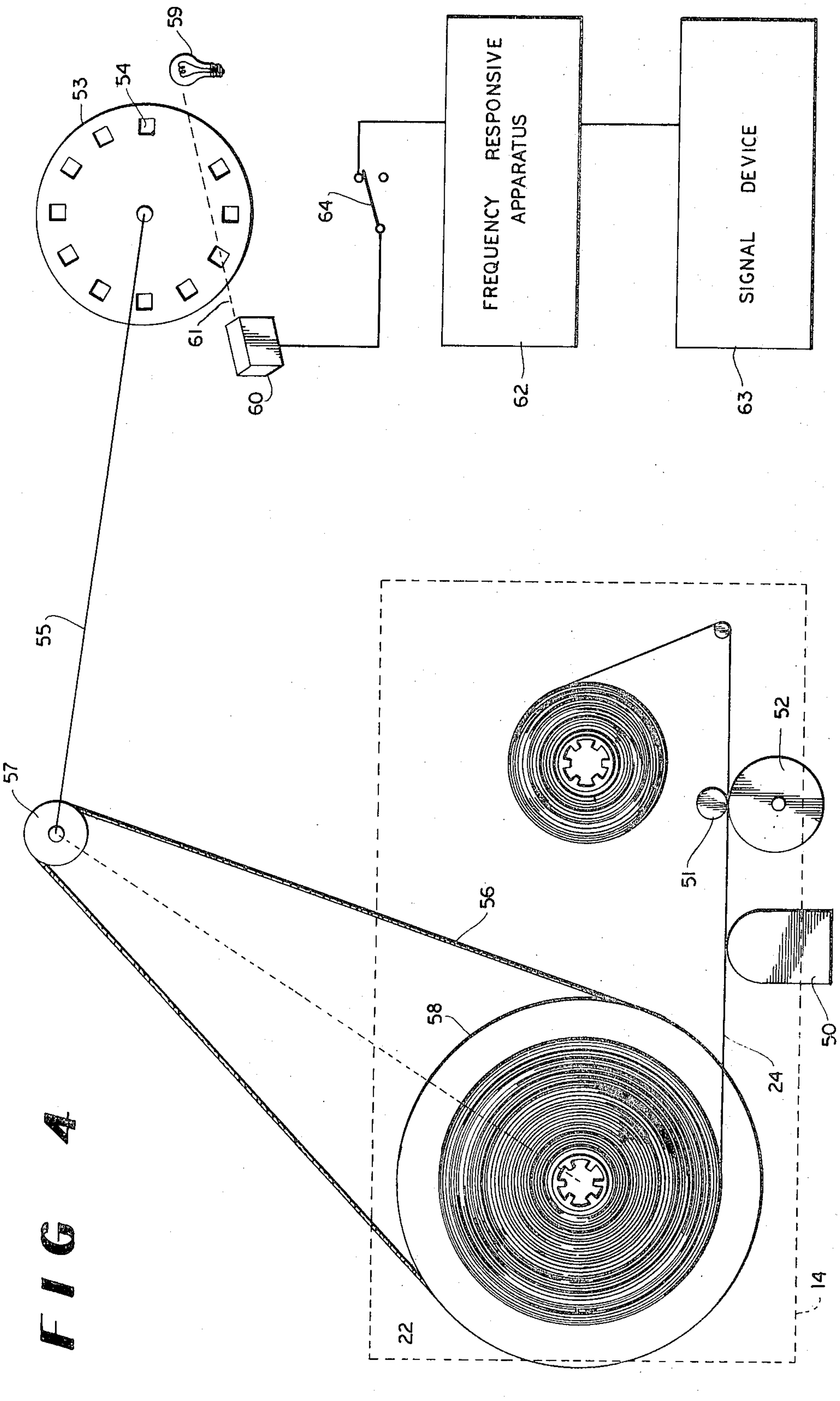
FIG. 4 shows a schematic view of a second disclosed embodiment of the present invention.

The first disclosed embodiment of the present invention as described above is operative to provide an indication of the actual amount of remaining tape without the necessity of any interconnection or physical contact between the tape cassette and the remainder of the dictating apparatus, since the windows 28 and 29 are already provided in state-of-the-art tape cassettes. An alternative apparatus for accomplishing the same results of identifying the time when no more than a predetermined amount of tape remains on a tape supply spool is shown by the second disclosed embodiment of the present invention as shown in FIG. 4 and as described below. With reference to FIG. 4, there is shown a schematic view of a tape recorder including a cassette 14 (shown in outline), the supply spool 22, and the winding spool 23. It will be appreciated by those skilled in the art that a length of magnetic recording tape extends from the supply spool 22 to pass along a transducer head 50, between a capstan 51 and a pinch roller 52, and thence to the winding spool 23. It will also be understood that tape recorders of this type further include a drive mechanism (not shown) which is selectively connected to the recorder spindles which engage the winding and supply spools, so that rotation in either the tape-forward or tape-reverse directions can be imparted to the spools.

According to the second embodiment of the present invention, a signal generating mechanism is coupled to be operated in response to the rotational speed of the tape supply spool 22, and is operative to produce a signal having a parameter which is a function of such rotational speed. By way of specific example as shown in FIG. 4, a disc 53 having a plurality of apertures 54 spaced in an annular array adjacent the periphery of the disc is mounted on a drive shaft 55 for rotation therein. The drive shaft 55 is suitably coupled, as by the drive belt 56 interconnected between the pulley 57 on one end of the drive shaft and the pulley 58, connected to the recorder spindle engaging the tape supply spool 22 to be driven by the tape supply spool spindle. It will be understood that the particular type of driving interconnection, as generally denoted by 65, between the supply spool 22 and the apertured disc 53 is not critical, and that a gear train or another alternative drive arrangement could be substituted for the depicted belt and pulley arrangement. Whatever the type of chosen drive mechanism, it is preferable to select a step-up ratio which causes the disc 53 to rotate at a speed which is greater than the rotational speed of the supply spool 22.

Positioned on opposite sides of the disc 53 are a suitable source 59 of radiated energy, such as a light-emitting diode, and a radiated energy responsive device 60, such as a phototransistor, positioned to receive radiated energy 61 which is permitted to pass through the apertures 54 in the rotating disc. The control signal output from the phototransistor 60 is connected through a switch 64 to a suitable frequency responsive apparatus 62, which is operative to provide an output to a signal device 63 comparable to the aforementioned signal device 37. The frequency responsive apparatus 62 may be any suitable apparatus which effectively functions as a high-pass filter to provide the aforementioned output to operate the signal device 63 when the frequency of the control signal from the phototransistor 60 attains a certain predetermined threshold frequency level. It will be apparent to those skilled in the art that the frequency responsive apparatus 62 can be provided either by filter circuitry employing at least some of the conventional elements of R, L, and C, or may alternatively be provided by frequency detection apparatus operating on a pulse counting principle.

Considering the operation of the apparatus as described with respect to FIG. 4, it will be appreciated that the traversing of the tape 24 at a relatively constant velocity by the combined effect of the capstan 51 and the pinch roller 52 causes the disc 53 to rotate at a rotational speed which is determined by the rotational speed of the supply spool 22 and by the mechanical ratio interconnecting the supply spool with the drive shaft 55. As the disc 53 is rotated, the radiation emitted from the source 59 and impinging on the energy responsive device 60 is chopped by the successive appearances of the apertures 54 in the nominal path of the radiation. The control signal supplied by the energy responsive device 60 thus is an AC signal the basic frequency of which is directly proportional to the rotational speed of the disc 53.

As the constant-velocity movement of the tape 24 continues in response to the rotation of the capstan 51 and the pinch roller 52, the diameter of the remaining tape on the supply spool 22 decreases and the rotational speed of the supply spool correspondingly increases. Since the disc 53 is mechanically driven by the rotation of the supply spool 22, the frequency of the control signal applied to the frequency responsive apparatus 62 also increases as the diameter of the remaining tape on the supply spool decreases. The frequency responsive apparatus 62 is set to provide an output to the signal device 63 when the AC frequency of the control signal provided by the energy responsive device 60 reaches the frequency which is produced in response to rotational speed caused by a predetermined diameter of tape remaining on the supply spool. As with the previously-described embodiment of the present invention, a signal is provided by the signal device 63 only when the diameter of tape remaining on the supply spool is reduced to a predetermined diameter. Assuming a certain thickness of the tape 24, this predetermined diameter and the corresponding predetermined frequency of the control signal applied to the frequency responsive apparatus 62 is always substantially the same irrespective of the amount of tape initially wound on the supply spool, and so the signal device 63 becomes operative when the amount of tape remaining on the supply spool has been reduced to this predetermined amount corresponding to a predetermined amount of remaining dictation time.

Since the tape transport mechanism of tape recording apparatus typically provides for selective fast-forward and/or fast-rewind operation of the supply and winding spools, suitable provision such as the switch 64 in the control signal line from the energy responsive device 60 to the frequency responsive apparatus 62 may be provided for operational interlock with the fast-forward and fast-rewind controls of the tape transport apparatus so that the signalling device 60 will be rendered inoperative by opening of the switch 64 during fast-winding conditions of the tape.

It will be apparent from the foregoing description of the disclosed embodiments that the present invention provides remaining tape sensing apparatus which accurately and repeatably indicates when the amount of tape on a tape supply reel is reduced to a predetermined amount and which functions completely independently of any accumulative or counting-type interconnection with the tape transport mechanism. The remaining tape sensing apparatus of the present invention requires no special index portion attached to or interrupting the tape at a particular location, and is completely compatible with conventional tape cassettes as well as reel-to-reel tape systems. Moreover, the remaining tape sensing apparatus of the present invention does not require resetting from a previous indicating operation, and, in the case of the first-described embodiment herein, does not require any additional moving components. While the first-described embodiment of the present invention may be desirable for recorders of the type depicted in FIG. 1 hereof, wherein the cassette receiving receptacle is configured to permit the radiated energy source 33 and the radiated energy responsive device 34 to be positioned on opposite sides of the receptacle, the latter-disclosed embodiment may be more readily adaptable to cassette recorders, for example, of the type wherein the cassette is inserted in a receptacle formed adjacent a top or other exterior wall of the recording apparatus.

Furthermore, it will be understood that the foregoing relates only to preferred embodiments of the present invention and that numerous alterations and modifications may be made therein without departing from the spirit and scope of the invention as set forth in the following claims.

What is claimed is:

1. In a tape transfer apparatus of the type having a receptacle to receive a tape cassette, said tape cassette having a first tape winding spool and a second tape winding spool supported for rotation between a pair of spaced apart parallel cover members, the axes of tape spool rotation being spaced apart one from the other and being substantially perpendicular to said cover members, a length of tape wound on and extending between said winding spools, mutually aligned transparent regions disposed in each of said cover members in relation to said axes to expose to view at least a predetermined maximum diameter of tape wound on one of said tape winding spools, said receptacle defined by an aperture through which said tape cassette may be moved in a direction substantially parallel to said cover members to insert or remove the cassette, means within said aperture to support said tape cassette within said receptacle, means positioned within said aperture and at one side of said receptacle to direct a beam of radiant energy toward one of said transparent regions so that said radiant energy is allowed to pass through said cassette and be present at a certain location on the other side of said receptacle only when not more than said predetermined diameter of tape is wound on said one spool, means operative to provide a control output signal in response to said radiated energy and positioned within said aperture and at said other side of said receptacle to receive said beam of energy passing through both of said transparent regions and present at said certain location on said other side in the absence of at least said predetermined diameter of tape wound on said one spool, and utilization means operative in response to said control output signal.

2. Apparatus as in claim 1, wherein at least said one tape winding spool has no flanges or other structure interposed between said transparent regions at said predetermined maximum diameter.

3. In a tape transfer apparatus of the type having a receptacle to receive a tape cassette having a first tape winding spool and a second tape winding spool supported for rotation between a pair of spaced apart parallel cover members, the axes of tape spool rotation being spaced apart one from the other and being substantially perpendicular to said cover members, a length of tape wound on and extending between said winding spools, mutually aligned transparent regions disposed in each of said cover members in relation to said axes to expose to view at least a predetermined maximum diameter of tape wound on one of said tape winding spools, the improvement comprising a tape receiving receptacle defined by an aperture through which said tape cassette may be moved in a direction substantially parallel to the cover members to insert or remove the cassette, means within said aperture to support the tape cassette within said receptacle, means positioned within said aperture and at one side of said receptacle to direct a beam of radiant energy toward one of said transparent regions so that said radiant energy is allowed to pass through said cassette and be present at a certain location on the other side of said receptacle only when not more than said predetermined diameter of tape is wound on said one spool, means operative to provide a control output signal in response to said radiated energy and positioned within said aperture and at said other side of said receptacle to receive said beam of energy passing through both of said transparent regions and present at said certain location on said other side in the absence of at least said predetermined diameter of tape wound on said one spool, and utilization means operative in response to said control output signal.

* * * * *